March 10, 1936.  W. P. PORTER  2,033,296
HOLDER FOR NURSING BOTTLES
Filed Jan. 31, 1934
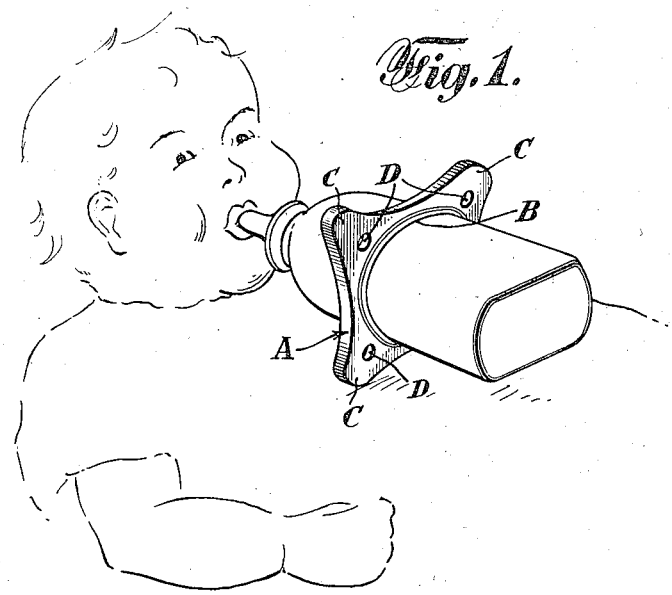
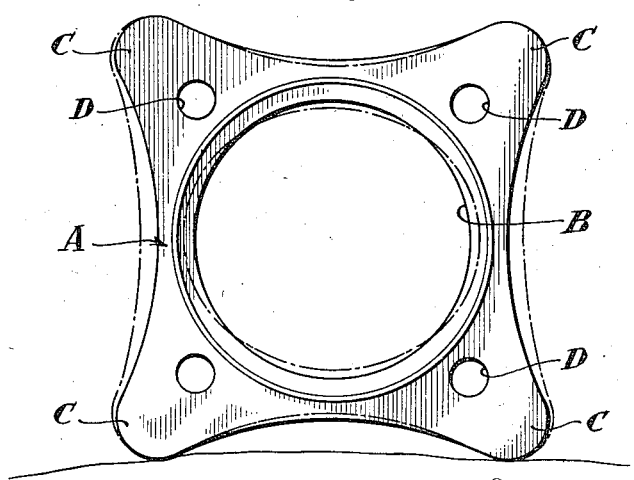
INVENTOR
Winfield P. Porter
BY
Prindle, Bean & Mann
ATTORNEYS Patented Mar. 10, 1936

2,033,296

UNITED STATES PATENT OFFICE 2,033,296

HOLDER FOR NURSING BOTTLES

Winfield P. Porter, Greene, Maine

Application January 31, 1934, Serial No. 709,101

3 Claims. (Cl. 248—105)

The object of my invention has been to provide a holder for nursing bottles which shall have the advantage of preventing such a bottle from sliding or rolling during nursing and thus of preventing the nipple from escaping from the baby's mouth, and to such ends my invention consists in the nursing bottle holder hereinafter specified.

In the accompanying drawing:

Fig. 1 is a perspective view of a bottle holder having a bottle therein which a child is nursing; and Fig. 2 is a plan view of a holder showing in solid lines the shape of the holder when not in use, and in the dotted lines the shape of the holder when mounted on a bottle.

In this illustrative embodiment of my invention, the holder A consists of a body made of rubber having an opening B whose greatest diameter is less than the greatest diameter of the nursing bottle, so that, when the nursing bottle is inserted in the said opening, the holder will have a firm grip on the bottle. The holder also has a series of projections C, of which there preferably are four, and which are spaced substantially equally apart. The contour between the projections is preferably a reentrant curve. Such curves, or other form of avoidance of a straight line between the projections, give the holder a broad base so that the bottle, even if resting upon the abdomen of the baby, will be firmly held from rolling off to one side or the other.

In the present instance, I have also provided the holes D, which make the holder more yielding when the bottle is being inserted therein, while yet permitting the holder to be made of sheet material of sufficient thickness so that the legs formed by the projections will not yield and permit the bottle to slip away from the baby's mouth.

While the illustrated embodiment of my invention is the best embodiment known to me, I am aware that my invention can be embodied in many different forms, and my invention is therefore not to be confined to the illustrated embodiment.

I claim:

1. A holder for babies' bottles comprising a substantially thin flat rubber body having a hole therein of a size to clasp the bottle, and also having smaller holes adjacent to said first-mentioned hole to enable said body more readily to conform to the bottle, said body having at least three projections on its periphery which are spaced apart at equal distances, the contour of which body between said projections being reentrant.

2. A holder for babies' bottles comprising a substantially thin flat rubber body having a hole therein of a size to clasp the bottle, and also having smaller holes adjacent to said first-mentioned hole to enable said body more readily to conform to the bottle, said body having at least three projections on its periphery which are spaced apart, the contour of which body between said projections being reentrant.

3. A holder for babies' bottles comprising a substantially thin, flat rubber body having a hole therein of a size to clasp the bottle, said body having a substantially polygonal contour with reentrant portions between the apices.

WINFIELD P. PORTER.